UNITED STATES PATENT OFFICE.

WILLETT C. PIERSON, OF CLEVELAND, OHIO.

OBTAINING PRODUCTS FROM FILMS.

1,352,216.  Specification of Letters Patent.  Patented Sept. 7, 1920.

No Drawing.    Application filed November 27, 1917.   Serial No. 204,298.

*To all whom it may concern:*

Be it known that I, WILLETT C. PIERSON, a citizen of the United States, and a resident of the city of Cleveland, in the county of Cuyahoga and State of Ohio, have made an Invention Relating to Obtaining Products from Films, of which the following is a specification.

The invention relates to the treating of scrap or waste celluloid, as it is known in the trade, so as to recover valuable products suitable for subsequent employment.

It is well known that moving picture films have a base or celluloid portion carrying a gelatinous coating containing silver and the present invention is particularly adaptable to the recovery of valuable products from the base or celluloid portion of the films after the gelatinous coating thereupon has been removable. As a considerable amount of scrap or waste celluloid is obtainable from waste moving picture films there will first be described a method for ridding the base or celluloid portion of the film of the coating thereupon.

The waste film is first washed in hot water, for example preferably in a perforated revoluble drum until no further surface discoloration appears upn the film, as may be ascertained by taking a sample of the film from the wash water.

It is well known as above indicated that the coating of a moving picture film comprises gelatine or a gelatinous matter in which the silver is carried or in which it is suspended, and the object of the washing in the manner just described is to remove the entire coating from the film base, that is, to remove all of the gelatinous matter and also the metallic substances contained therein. When the film base, as it may be called, is clean, it is removed from the hot wash water and treated as hereinafter described. The metallic substance and gelatinous matter remaining in the hot wash water can be recovered by proper treatments.

The removed cleaned film base is preferably subjected to a drying process at approximately 175 degrees F. When dried it is placed in a suitable solvent such as acetone or other suitable wood distillate and agitated so as to facilitate the dissolving of the film base, to wit, the celluloid in the dissolvent. The purpose of drying the film base before placing it in the dissolvent is to prevent the diluting of the dissolvent by water which would mix with the dissolvent, thus diluting it and retarding its action. As soon as the celluloid is dissolved hot water is added to the solution in an amount just sufficient to cause a separating of the soluble nitrated cotton which is in a liquid condition from the rest of the liquid of the dissolvent solution and there collects, as the water is added, a thick homogeneous mass, which mass comprises the cotton and some camphor. This mass is now removed or separated, as by straining, from the remaining liquid which comprises the dissolvent, the added water and some camphor. The mass is further treated with hot water at approximately 200 degrees F. and these washings are continued until there is no turbidity in the wash water. The washings in hot water as just described remove a considerable part of the camphor that is with the nitrated cotton and the washings may be employed to remove entrained foreign substances, for example, coloring matter. If the washings are sufficiently continued a large percentage if not all of the camphor can be removed, as well as foreign substances.

The more complete the removal of camphor the more nearly the nitrated cotton reaches the state in which it was after the original nitrating of the cotton took place for the original manufacture of the celluloid. When the camphor and nitrated cotton and other ingredients were originally mixed in the manufacture of the celluloid the camphor operated as a solid solvent for the nitrated cotton (gun cotton) and the washing operation just described serves to eliminate, in whole or in part, the solid solvent (to wit, the camphor in the mixture of nitrated cotton and camphor) from the mass subjected to the washings.

Probably the reason why the nitrated cotton (and some of the original camphor) collects in a thick homogeneous mass when hot water is added to the dissolvent solution is because some of the camphor which would ordinarily act as a dissolvent for some of the cottom is itself dissolved in the water and thus allows the nitrated cotton to reform and collect in a mass. However, as the hot water will not get into intimate contact with and be enabled to absorb all of the camphor some of it must remain with or be mixed with the nitrated cotton, and to the extent that camphor remains in the thick homogeneous mass to a corresponding extent nitrated cotton will probably remain in solid solution with the camphor in the mass.

Whether or not this theory as to what takes place is correct is not certain but this much is certain, that when celluloid is treated according to the steps above outlined there is derived therefrom a thick homogeneous mass which would seem from its appearance to have nitrated cotton as its base and to also include camphor. The dissolvent solution which remains after the removal of the thick homogeneous mass has been effected is cooled, as by sudden chilling, so that the camphor which is in the solution will be precipitated. The precipitated camphor and the liquid of the solution are then separated, as by filtering, and the liquid or filtrate may now be sent to a still where the acetone or wood distillate may be recovered. The other hot water washings may also be chilled for the purpose of recovering the camphor therein, if there should be contained therein sufficient camphor to warrant the carrying out of the process to this extent. The white mass of nitrated cotton which results from the washings above described is then preferably thoroughly dried and passed through a grinding mill to reduce it to powder. In other words the grinding mill converts the mass acted upon into finely divided form. This nitrated cotton residue is put in this powdered form, as it is more soluble in certain dissolvents when in such condition, and is therefore more adaptable for the work in which it is likely to be subsequently used.

The nitrated cotton product is adaptable for several uses, for instance, it may become the base employed in the manufacture of such substances as artificial leather, known under the trade name of fabrikoid, pantasote, etc., or it may become the base used in the manufacture of varnishes, and the like, or it may be worked by proper processes into celluloid. An example of the latter method would be illustrated by taking this nitrated cotton, dissolving it in acetone or any wood distillate and allowing the solution to dry or harden until a relatively solid or plastic product is formed after which, by proper working, it may take the form of any commercial celluloid product.

The invention is applicable not only to the recovery of the products derivable from such substances as films, but may also be employed with advantage to the trade and recover all products from waste celluloid or pyroxylin compounds, or such compounds as have a nitrocellulose base. If the waste celluloid that is being treated be a colored celluloid in which some pigment has been added or some other solid or coloring matter, then having due regard for the particular coloring substance or solid matter included therein and by proper treatment one would be enabled to remove such solid or coloring matter and thus obtain a clear form of nitrated cotton product which will be adaptable for use where a transparent celluloid is desired.

The improvements herein set forth are not limited to the precise construction and arrangement described for they may be embodied in various forms and modifications without departing from the spirit and scope of the invention.

What I claim is:

1. The method which comprises dissolving celluloid in acetone, adding water until a thick mass collects in the liquid, removing the thick mass and washing the same, and finally drying and pulverizing the washed mass.

2. The method which comprises dissolving dry celluloid in acetone, adding hot water to the resulting solution in amounts sufficient whereby a thick homogeneous mass will be formed in the liquid, separating said mass from the liquid, subsequently washing said thick mass with hot water to remove camphor from the mass, and finally rendering the washed mass in finely divided form.

3. The method which comprises placing celluloid in acetone to dissolve the celluloid, adding hot water to the resulting solution containing the dissolved celluloid until a thick mass collects, separating said thick mass from the liquid, and chilling said liquid and recovering the precipitated camphor.

4. The method which comprises dissolving celluloid in a wood distillate that is suitable to dissolve the celluloid, adding water thereto, separating the thick mass formed by the addition of water from the liquid, chilling the liquid to precipitate the camphor contained therein, filtering to remove the camphor and distilling the filtrate to recover the wood distillate.

5. The method which comprises dissolving celluloid in acetone, adding water to the resulting solution until a thick mass is formed, separating said thick mass and the liquid within which it is formed, and further washing said mass to remove the camphor therefrom.

Specification signed and witnessed this 23 day of November, A. D. 1917.

WILLETT C. PIERSON.

Signed in the presence of—
 JOHN G. MITCHELL,
 CHAS. E. FERRELL.